US012407491B1

(12) United States Patent
Straujums et al.

(10) Patent No.: US 12,407,491 B1
(45) Date of Patent: Sep. 2, 2025

(54) STANDARD ENCRYPTION USING PRE- AND POST-TRANSFORMATIONS

(71) Applicant: Zimperium, Inc., Dallas, TX (US)

(72) Inventors: Atis Straujums, Salaspils parish (LV); Nikita Larka, Rīga (LV); Māris Valdats, Rīga (LV)

(73) Assignee: Zimperium, Inc., Dallas, TX (US)

( * ) Notice: Subject to any disclaimer, the term of this patent is extended or adjusted under 35 U.S.C. 154(b) by 0 days.

(21) Appl. No.: 18/991,189

(22) Filed: Dec. 20, 2024

(51) Int. Cl.
*H04L 29/06* (2006.01)
*H04L 9/06* (2006.01)
*H04L 9/08* (2006.01)

(52) U.S. Cl.
CPC .......... *H04L 9/0631* (2013.01); *H04L 9/0863* (2013.01)

(58) Field of Classification Search
None
See application file for complete search history.

(56) References Cited

U.S. PATENT DOCUMENTS

| 12,069,158 | B1* | 8/2024 | Thompson | H04L 9/0631 |
| 12,174,971 | B1* | 12/2024 | Kovac | G06F 21/72 |
| 2023/0093306 | A1* | 3/2023 | Hamburg | H04L 9/004 |
| | | | | 713/189 |
| 2023/0123207 | A1* | 4/2023 | Mcnutt | G06F 21/602 |
| | | | | 713/167 |
| 2024/0333471 | A1* | 10/2024 | Kumar | H04L 9/0637 |
| 2024/0333472 | A1* | 10/2024 | Kumar | G09C 1/00 |
| 2024/0372718 | A1* | 11/2024 | Fiske | G09C 1/00 |
| 2025/0013430 | A1* | 1/2025 | Swann | H04L 9/0631 |
| 2025/0038952 | A1* | 1/2025 | Macchetti | H04L 9/003 |
| 2025/0047467 | A1* | 2/2025 | Wong | H04L 9/0631 |

OTHER PUBLICATIONS

Gupta, Ashutosh; Agrawal, Anita. Advanced Encryption Standard Algorithm with Optimal S-box and Automated Key Generation. 2022 2nd International Conference on Advance Computing and Innovative Technologies in Engineering (ICACITE). https://ieeexplore.ieee.org/stamp/stamp.jsp?tp=&arnumber=9823662 (Year: 2022).*

(Continued)

*Primary Examiner* — Jeremiah L Avery
(74) *Attorney, Agent, or Firm* — Fenwick & West LLP

(57) ABSTRACT

A system and a method are disclosed for performing encryptions with pre- and post-standard data transformations. The system receives an input that includes cleartext data. The system may apply a pre-encryption to the input by performing one or more rounds of data transformations, and the pre-encryption transforms the cleartext data into non-cleartext data. The system applies a core encryption to the non-cleartext data. The core encryption includes a standard cipher algorithm that transforms the non-cleartext data into encrypted ciphertext. The system then applies a post-encryption to the encrypted ciphertext. The post-encryption includes one or more rounds of additional data transformations. The system generates an encryption of the input at a local client device based on an output from the post-encryption. In some embodiments, the pre-encryption, core encryption and post-encryption are under a White-box encryption to protect intermediate data.

18 Claims, 5 Drawing Sheets

(56) References Cited

OTHER PUBLICATIONS

Won, Jongho et al. A Secure Shuffling Mechanism for White-Box Attack-Resistant Unmanned Vehicles. IEEE Transactions on Mobile Computing, vol. 19, Issue: 5. https://ieeexplore.ieee.org/stamp/stamp.jsp?tp=&arnumber=8658144 (Year: 2019).*

S, Abhiram L et al. FPGA implementation of dual key based AES encryption with key Based S-Box generation. 2015 2nd International Conference on Computing for Sustainable Global Development (INDIACom). https://ieeexplore.ieee.org/stamp/stamp.jsp?tp=&arnumber=7100315 (Year: 2015).*

Nejad, Farshid Hossein et al. Analysis of avalanche effect on advance encryption standard by using dynamic S-Box depends on rounds keys. 2014 International Conference on Computational Science and Technology (ICCST). https://ieeexplore.ieee.org/stamp/stamp.jsp?tp=&arnumber=7045184 (Year: 2014).*

Yim, Houngshim et al. An Efficient Structural Analysis of SAS and its Application to White-Box Cryptography. 2021 IEEE Region 10 Symposium (TENSYMP). https://ieeexplore.ieee.org/stamp/stamp.jsp?tp=&arnumber=9550967 (Year: 2021).*

* cited by examiner

STANDARD ENCRYPTION USING PRE- AND POST-TRANSFORMATIONS

TECHNICAL FIELD

The disclosure generally relates to the field of computing technology, and more particularly relates to encryption.

BACKGROUND

Software applications face numerous security risks that can have severe consequences, such as data breaches, attacks from malicious software programs, unauthorized operations, etc. Current methods often use Whitebox encryption to prevent attackers from extracting or recovering encryption keys, even when attackers can observe and manipulate the algorithm and data at every step. While useful in specific applications, Whitebox encryption may be susceptible to specialized attacks. For instance, attackers may leverage side-channel analysis techniques by feeding known inputs to a Whitebox cipher and analyzing a trace of its execution, or introducing faults at specific stages of an Advanced Encryption Standard (AES) computation to observe discrepancies between faulty and correct outputs that expose key bits. The attackers may systematically input data to analyze patterns and look for statistical properties (e.g., correlations in intermediate values) that reveal information about the key.

SUMMARY

Systems and methods are disclosed herein for performing Whitebox encryption with non-standard pre- and post-AES data transformations. In typical Whitebox with AES encryptions, plaintext data is encrypted directly by the AES algorithm and then converted to ciphertext. Attackers may have extensive access to observe or interfere with the encryption process. This disclosure provides an enhanced Whitebox encryption with pre- and post-AES data transformations which add layers of security around the AES encryption core, creating a protective "wrapper" that conceals the actual data flowing in and out of AES. With the pre-AES data transformation transforming data ahead of using AES, even if an attacker is able to observe the input data being fed into the pre-AES process, attackers cannot directly connect it to the actual input to AES because the pre-AES process details are unknown to the attacker. Similarly, the output produced by the post-AES transformation does not reveal the output of the AES encryption. No access to the AES inputs and outputs makes mounting attacks against Whitebox AES significantly harder. For an attacker to successfully mount such attacks, they would need to understand and reverse both the pre-encryption applied to the plaintext and the post-encryption applied to the ciphertext. This dual-layered approach significantly strengthens the Whitebox encryption, making it far more resistant to attacks. Alternatively, only the pre-AES data transformation or only the post-AES data transformation may be used. In some embodiments, the pre-encryption, core encryption and post-encryption are under a White-box encryption to protect intermediate data.

In some embodiments, the pre- and post-AES data transformations include non-standard AES transformation, e.g., non-standard S-boxes (Substitution-boxes) and unique round keys, which add another robust layer of protection. Unlike standard AES implementations that rely on predictable structures, these transformations employ randomized S-boxes and keys, making traditional side-channel attacks and fault injection methods significantly less effective. Since these conventional methods depend on the predictable behavior of standard AES structures, the introduction of randomness breaks this predictability, rendering statistical models based on typical AES behavior ineffective. Together, these features create a highly resilient encryption scheme that thwarts a wide range of sophisticated attack strategies.

In some embodiments, the system receives an input that includes cleartext data. The system may apply a pre-encryption to the input by performing one or more rounds of data transformations, and the pre-encryption transforms the cleartext data into non-cleartext data. The system applies a core encryption to the non-cleartext data. The core encryption includes a standard cipher algorithm that transforms the non-cleartext data into encrypted ciphertext. The system then applies a post-encryption to the encrypted ciphertext. The post-encryption includes one or more rounds of additional data transformations. The system receives and stores an output from the post-encryption as an encryption of the input at a local client device. In some embodiments, the pre-encryption and the post-encryption use non-standard AES cipher algorithms for data transformation.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

Figure 1:
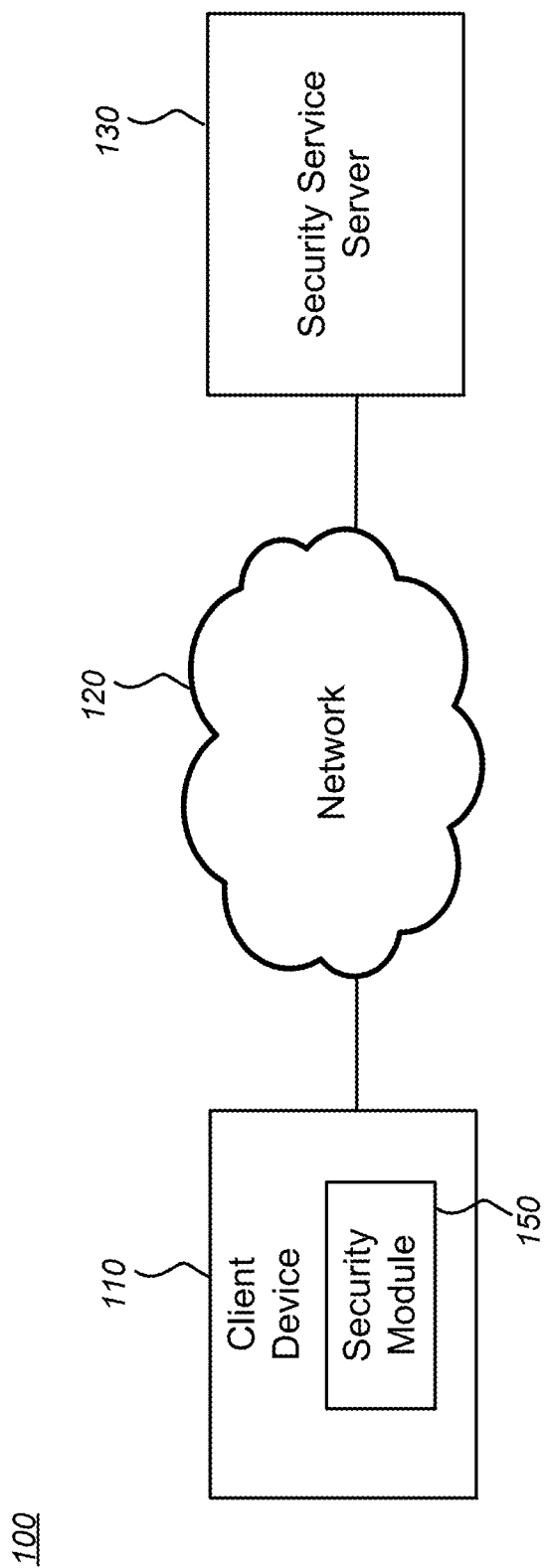
FIG. 1 illustrates one embodiment of a system environment including a computing device with a security system, according to one or more embodiments.

FIG. 1 illustrates one embodiment of a system environment 100 including a security service server 130, according to one or more embodiments. Environment 100 also includes network 120, and a client device 110. The system environment 100 may also include different or additional entities.

The security service server 130 is a computer system configured to provide encryption for a message. The message refers to information or data to be secured by encoding it into a protected format. The message may include various forms of data, such as readable text (e.g., plaintext), binary files like images or documents, or sensitive information such as passwords, credit card details, or confidential business data. The security service server 130 may include a singular computing system, such as a single computer, or a network of computing systems, such as a data center or a distributed computing system. The security service server 130 may be one or more servers (e.g., forming a cloud-based service) that receives data and performs analysis to generate protection actions for an application. In some implementations, the security service server 130 may receive a message from a client device 110 via the network 120 and encrypt the received message. In some implementations, the security service server 130 may identify a message for encryption. For example, the security service server 130 may scan a software application, a data object, a document, etc. stored in and/or accessed by a client device 110, and identify a message, data, code, etc. for encryption. In some implementations, the security service server 130 may provide a security module (e.g., the security module 150) which may be installed/located in a client device 110. For example, the security module 150 may be a component part of an application that needs to encrypt messages. The security module 150 may communicate with the application using direct function calls or some form of inter-process communications without using the network 120. In one instance, the entire encryption process may be performed on the client device 110 without accessing the network 120.

The security service server 130 may access the client device 110 through the network 120. In some embodiments, the network 120 includes any combination of local area and/or wide area networks, using wired and/or wireless communication systems. The network 120 may use standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 120 may be encrypted using any suitable technique or techniques.

The client device 110 includes one or more processors configured to control operation of the client device 110 by performing functions. The client device 110 may be a server, a computing device, an app store, a website, a physical media (e.g., hard drive, disks, etc.), a cloud-based platform and the like. Examples of such client devices 110 include personal computers (PC), desktop computers, laptop computers, tablets (e.g., iPADs), smartphones, wearable electronic devices such as smartwatches, or any other suitable electronic devices. In various embodiments, a client device 110 includes a memory comprising a non-transitory storage medium on which instructions are encoded. The memory may have instructions encoded thereon that, when executed by the processor, cause the processor to perform functions.

In some embodiments, a client device 110 executes an application allowing a user of the client device 110 to interact with the security service server 130. For example, a client device 110 can execute a browser application to enable interaction between the client device 110 and the data processing system 106 via the network 120. In another embodiment, the client device 110 interacts with the security service server 130 through an application programming interface (API) running on a native operating system of the client device 110, such as IOS® or ANDROID™.

The client device 110 may provide messages to be encrypted and store the encrypted messages. The security service server 130 may access the client device 110 to access information/data/messages to be encrypted. In some embodiments, the client device 110 may be a data source that includes messages, such as software applications, program codes, metadata, raw type data, documents, files, data object, etc. In some embodiments, the client device 110 may include a data store that stores the encrypted messages. In some embodiments, the client device 110 may include a security module 150 that is provided by the security service server 130 for encrypting messages.

Security System Configuration

Figure 2:
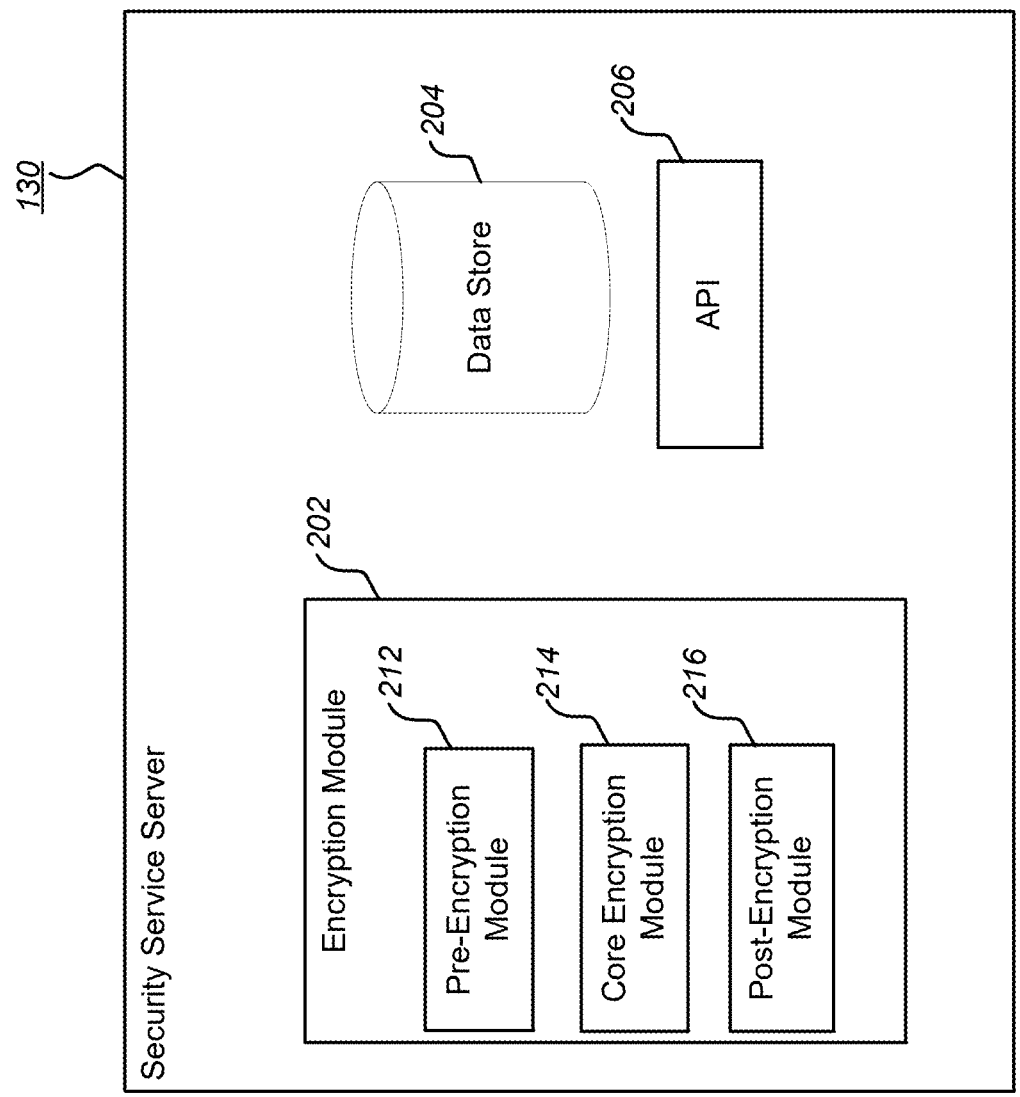
FIG. 2 illustrates one embodiment of exemplary modules of a security system, according to one or more embodiments.

FIG. 2 illustrates one embodiment of exemplary modules of a security system, according to one or more embodiments. The security service server 130 includes an encryption module 202, a data store 204, and an application program interface (API) 206. The modules depicted with respect to security service server 130 are exemplary; more or fewer modules, and databases may be used, consistent with the disclosure provided herein.

The encryption module 202 is configured to receive a message to be encrypted, apply encryption algorithms to the message, and output the encrypted message. In some embodiments, the encryption module 202 may use a standard encryption as a core encryption. The standard encryption may include symmetric encryption algorithms such as an Advanced Encryption Standard (AES), Data Encryption Standard (DES), etc., asymmetric encryption algorithms such as Rivest-Shamir-Adleman (RSA), Elliptic Curve Cryptography (ECC), and the like. The encryption module 202 may include one or more layers of transformations before and after the core encryption, adding a significant layer of complexity and obfuscation. In some embodiments, the encryption module 202 may modify traditional AES encryption structure and protect the input and/or output values from being directly observable.

The encryption module 202 includes a pre-encryption module 212, a core encryption module 214 and a post-encryption module 216. The pre-encryption module 212 receives a message to be encrypted and applies pre-encryption to the message. The core encryption module 214 receives output from the pre-encryption module 212 and applies standard encryption algorithms to the output from the pre-encryption module 212. The 216 receives output from the core encryption module 214 and applies post-encryption to further encrypt the output from the pre-encryption module 214. In some embodiments, the encryption module 202 may include all or some of the three components. In some implementations, the encryption module 202 may apply all three encryptions, i.e., the pre-encryption, the core encryption, and the post-encryption to an input message and output an encrypted message. In some implementations, the encryption module 202 may apply some of the encryptions, e.g., the pre-encryption and core encryption, or the core encryption and the post-encryption to encrypt an input message. In some implementations, the encryption module 202 may perform a White-box encryption, where the White-box protection is applied to the pre-encryption, core encryption, and post-encryption. The pre-encryption, core encryption and post-encryption are under a White-box encryption to protect intermediate data.

The pre-encryption module 212 receives a message to be encrypted and applies pre-encryption to the message. The pre-encryption module 212 may include one or more rounds of data transformations that transform the message. A round of data transformation refers to a single iteration of the cryptographic transformation process that is applied to the data being encrypted or decrypted. Each round consists of a series of defined operations that aim to progressively scramble the input data and mix it with the encryption key, ultimately converting it into secure ciphertext. In some embodiments, the pre-encryption module 212 receives a message which includes cleartext data. The pre-encryption module 212 applies pre-encryption to the message to transform the cleartext data into non-cleartext data.

In some embodiments, each round of the pre-encryption includes a standard encryption with custom S-box and random round keys. In one instance, each round of the pre-encryption may be designed to mimic an AES structure but with variations that add complexity and unpredictability. For example, the pre-encryption may map each byte in the cleartext data to a new byte using a custom S-box. Unlike AES, which uses a fixed S-box, the pre-encryption may use a randomly generated S-box that is independent of the main AES key. Each round of the pre-encryption may perform the same data transformation as an AES round, except using a custom S-box and an independent round key. This custom S-box is derived from a unique key or randomly generated 8-bit permutation, often called the "S-box key." By making this substitution non-standard and unique for each transformation, attackers cannot rely on known properties of the standard AES S-box to infer patterns or extract information from the transformed data.

In some embodiments, the pre-encryption may apply row shifting operations to the cleartext data. In one example, the transformed data may be organized into a 4×4 byte matrix, and each row is shifted by a set number of positions to create a dispersed output. For example, the second row may shift by one byte, the third row by two bytes, and so on. This disperses data across different columns so that correlations between cleartext bytes and their positions in the transformed data are minimized.

The pre-encryption may include column mixing operations that further diffuse the data by applying a mathematical transformation to each column in the 4×4 matrix. In AES, column mixing involves multiplying each column by a fixed polynomial in a finite field. The pre-encryption may use a different transformation matrix to further distinguish the transformation from AES. In this way, each byte in a column is affected by the others, making it difficult to isolate or infer individual byte values. The combination of row shifting and column mixing together introduces both dispersion and diffusion, preventing simple patterns or dependencies from emerging in the transformed data.

In some implementations, the pre-encryption may use random round keys. In one instance, the round key is generated randomly and XORed with the transformed data to introduce additional complexity. Unlike AES, where round keys are derived from a single key through a fixed key schedule, the pre-encryption may use entirely independent keys for each round, further obfuscating the relationship between the transformed message and the original message.

In some implementations, the pre-encryption may include one or more rounds of encryptions/transformations, such as 2, 4, 10, 16, etc. rounds of transformations. In some implementations, the pre-encryption may include at least two rounds of encryptions. In a single round of transformation, the diffusion may be relatively limited; patterns from the plaintext could still be recognizable. With a second round of transformation, another layer of dispersive operations may be added, such as non-linear byte substitution and row and column mixing. In this way, even small changes in the cleartext propagate widely and uniformly across the output. This additional round minimizes the possibility of statistical leakage, where attackers might deduce relationships between cleartext and transformed data bytes. In some embodiments, adding a second round of transformation may introduce greater non-linearity and complexity. Non-linearity in cryptographic transformations disrupts simple linear relationships between the plaintext and ciphertext. Each round of transformation applies a custom, randomly generated S-box that substitutes each byte with a unique, unpredictable value based on a transformation-specific key. With only one round, this non-linearity would be less pronounced, making it easier for attackers to reverse-engineer or predict certain transformations. By adding a second layer of unique S-box substitution and independent key material, the transformation becomes significantly more complex and difficult for an attacker to model or replicate.

The pre-encryption modifies the cleartext data before it reaches the core encryption module 214. The pre-encryption may prevent attackers from accessing or inferring the original cleartext data, even if they can observe or interact with the encryption process. By transforming the plaintext in this way, the input entering the AES core no longer resembles the original plaintext, making it far more challenging for an attacker to reverse-engineer or analyze.

The core encryption module 214 receives the output from the pre-encryption module 212 and applies standard encryption to the received output. In some implementations, the standard encryption may include one or more rounds of encryption. The standard encryption may be AES, DES, RSA, ECC, or other encryption algorithms. In one example, the standard encryption may be an AES encryption with multiple rounds of AES, such as, 10 rounds, 12 rounds or 14 rounds of AES cipher algorithms. An AES encryption is a symmetric block cipher designed to securely encrypt data by processing it in fixed-sized blocks (e.g., 128 bits).

In some embodiments, the core encryption may be an AES encryption. The core encryption may include a Sub-Bytes transformation that substitutions each byte in the matrix with a corresponding value from a S-box, introducing non-linearity and confusion and making it difficult to reverse the encryption without the key. The core encryption may include ShiftRows transformation that shifts rows in the matrix to the left by a certain number of positions, spreading data across columns and increasing the dependency between bytes; and MixColumns transformation that transforms each column through matrix multiplication in a finite field, spreading the influence of each byte across the entire block. In some examples, the core encryption may include AddRoundKey transformation which XORs the current round key with the state matrix, further scrambling the data using a unique key specific to each round. The output from the core encryption module 214 is the ciphertext 314, a fully encrypted version of the non-cleartext data 312.

The post-encryption module 216 receives the output from the core encryption module 214 and applies one or more rounds of data transformations to the ciphertext in the output from the core encryption module 214. In some examples, the post-encryption module 216 may include at least two rounds of data transformations. In some implementations, each round of the post-encryption may include a standard encryption with custom S-box and random round keys. In some implementations, the standard encryption may be an AES encryption. Similar to the pre-encryption, each round of the post-encryption may be designed to mimic an AES structure and include variations that add complexity and unpredictability. Each round of the post-encryption includes a custom S-box, row shifting operations, mixing operations, and uses random round keys. In some embodiments, the post-encryption incudes two rounds of transformations, each with a separate key and S-box. These final transformations produce the ultimate ciphertext, which is highly obscured compared to the output from the core AES encryption alone. The post-encryption module 216 applies a post-encryption to the encrypted ciphertext and outputs an encrypted message corresponding to the input message to the encryption module 202.

The data store 204 may be configured to store encrypted messages and/or messages to be encrypted. The data store 204 may collect, organize, and manage data for retrieval, updates, and analysis.

In some embodiments, the encryption module 202 may provide an API 206, a software interface that provides functions and tools for users to integrate cryptographic operations into their applications. The API 206 may be used to encrypt and decrypt messages, manage cryptographic keys, and perform related operations like hashing and digital signature verification. In some embodiments, the API 206 allows a user to input an optional password to add an extra layer of security. This password influences the encryption and decryption processes by introducing additional key material or transformations that are derived from it. The password may be not stored within the encrypted data, and remains hidden from anyone who does not possess it. When a user provides a password during encryption, it is used as input to generate cryptographic material. For example, the security service server 130 may use a key derivation function (KDF) to generate a derived key that is used in the encryption process. This derived key strengthens security by transforming the password into a fixed-length, cryptographically secure key that may be used reliably for both encryption and decryption. During the encryption process, the derived key from the password may either be used as an additional encryption key or combined with the main encryption key.

Encryption with Pre- and Post-AES Transformations

Figure 3:
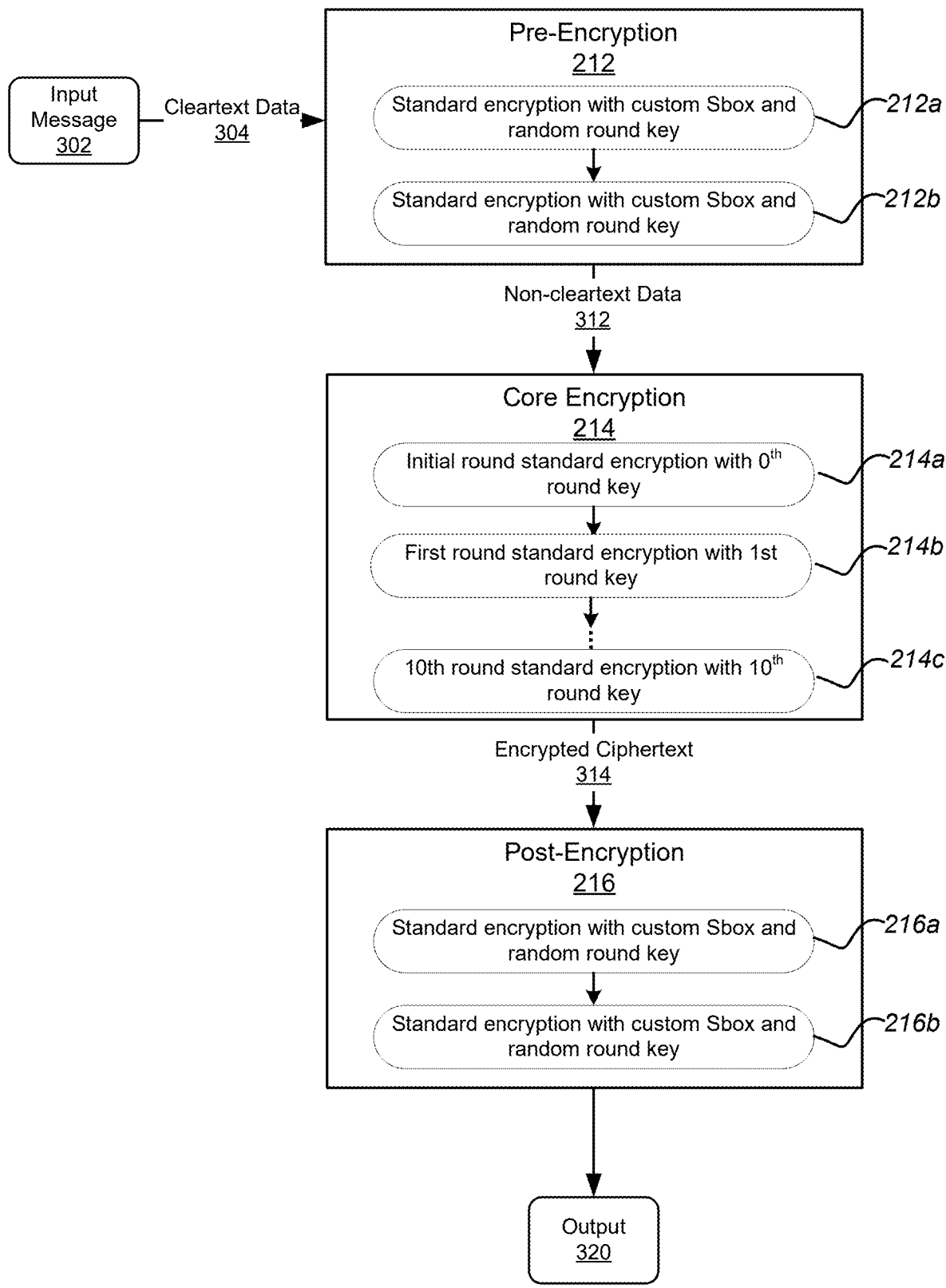
FIG. 3 is a conceptual diagram of an example encryption process with pre- and post-AES transformations, according to one or more embodiments.

FIG. 3 is a conceptual diagram of an example encryption process 300 with pre- and post-AES transformations, according to one or more embodiments. In various embodiments, the process includes different or additional steps than those described in conjunction with FIG. 3. The process described in conjunction with FIG. 3 may be carried out by the security service server 130 in various embodiments.

As shown in FIG. 3, the security service server 130 receives an input message 302 to encrypted. The input message 302 may include information or data to be encrypted by encoding it into an encrypted format. The message may include various forms of data, such as readable text (e.g., plaintext), binary files like images or documents, or sensitive information such as passwords, credit card details, or confidential business data. In some embodiments, the input message 302 may include cleartext data 304. Cleartext data 304 refers to any type of data that is stored, transmitted, or processed without encryption or any form of obfuscation. For example, a document or message contains sensitive information (like passwords or personal data) and is not encrypted, may be considered cleartext data. In another example, data that is transmitted over a network without encryption (such as sending unencrypted HTTP requests) may be considered as cleartext data. An input message 302 including cleartext data 304 may be in its raw, unprotected form and may be easily read or accessed by anyone who has access to it.

The pre-encryption module 212 receives the input message 302 and applies pre-encryption to the input message 302. The pre-encryption transforms the cleartext data 304 into non-cleartext data 312. In some embodiments, the pre-encryption may include one or more rounds of standard encryptions. In one example, as shown in FIG. 3, the pre-encryption includes two rounds of data transformations, e.g., 212a and 212b. Each round of the pre-encryption includes an AES encryption with custom S-box and random round keys. For example, the pre-encryption may map each byte in the cleartext data 304 to a new byte using custom S-boxes. Each round of the pre-encryption may perform the same data transformation as an AES round, except using a custom S-box and an independent round key. The original cleartext data 304 goes through the pre-AES transformation rounds, each using an independent key and a custom S-box.

The core encryption module 214 receives the non-cleartext data 312 and applies core encryption to the non-cleartext data 312. The core encryption transforms the non-cleartext data 312 encrypted ciphertext 314. In one example, as shown in FIG. 3, the core encryption may include multiple rounds of AES encryption with respective round keys, e.g., round 214a, round 214b, round 214c, etc.

In one instance, the AES may include a 128-bit encryption key and expand the encryption key into 11 round keys using a key scheduling algorithm. Each round key is unique and ensures that the encryption process is tied securely to the original key. At the initial round, e.g., round 214a, the non-cleartext data 312 is XORed with the first-round key, forming the foundation for the subsequent rounds. In each round of rounds 1-9 (e.g., round 214b), the core encryption may include a SubBytes transformation that substitutes each byte in the matrix with a corresponding value from a S-box, ShiftRows transformation that shifts rows in the matrix to the left by a certain number of positions, MixColumns transformation that transforms each column through matrix multiplication in a finite field, and AddRoundKey transformation which XORs the current round key with the state matrix. At the final round of the core encryption (e.g., round 214c), the post-encryption omits the MixColumns transformation and may apply only the SubBytes, ShiftRows, and AddRoundKey transformations. The output from the core encryption module 214 is the ciphertext 314, a fully encrypted version of the non-cleartext data 312.

The post-encryption module 216 receives the ciphertext 314 and applies post-encryption to the ciphertext 314. The post-encryption further encrypts the ciphertext 314 and the output from the ciphertext 314 may be used as the encryption of the input message 302. In one example, as shown in FIG. 3, the post-encryption includes two rounds of data transformations, and each round of the post-encryption includes AES encryption with custom S-box and random round keys. The ciphertext 314 goes through the post-AES transformation rounds, each using an independent key and a custom S-box, row shifting operations, mixing operations, and uses random round keys. These final transformations produce the ultimate ciphertext, which is highly obscured compared to the output from the core AES encryption alone.

Figure 4:
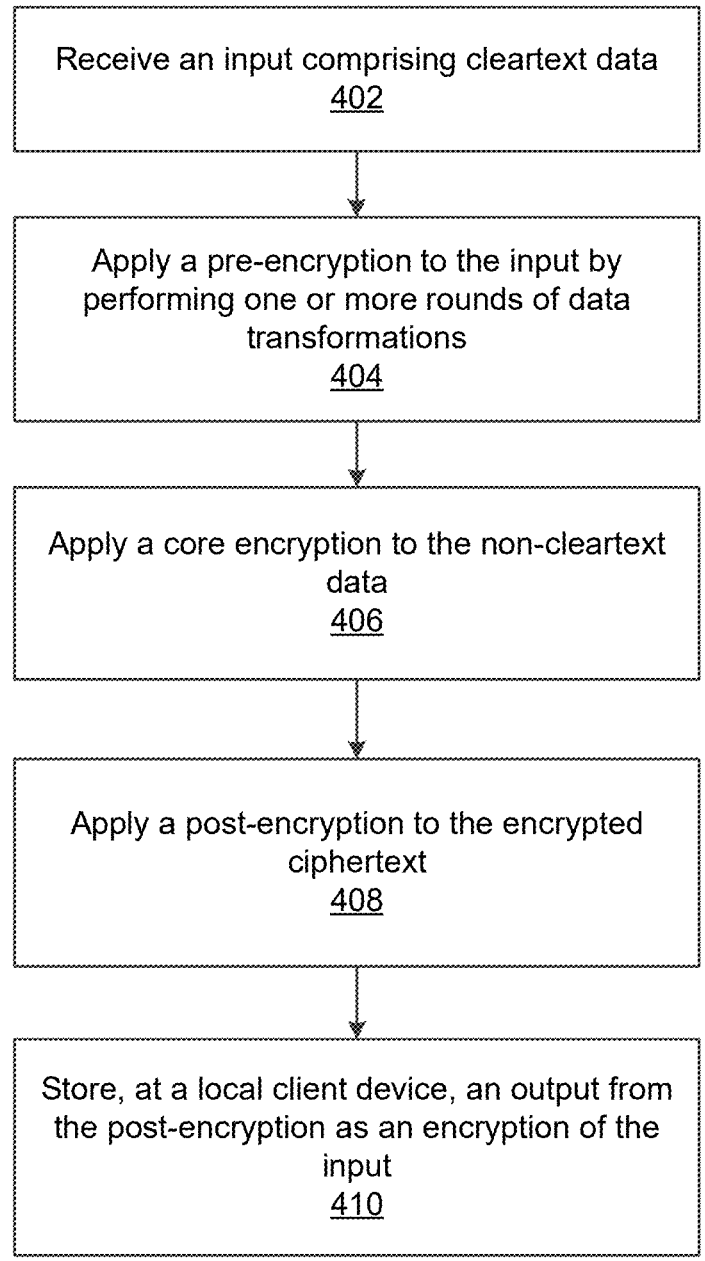
FIG. 4 illustrates one embodiment of a process for encrypting an input message using a Whitebox encryption with pre- and post-AES transformations, according to one or more embodiments.

FIG. 4 illustrates one embodiment of a process 400 for encrypting an input message using a Whitebox encryption with pre- and post-AES transformations, according to one or more embodiments. In various embodiments, the process includes different or additional steps than those described in conjunction with FIG. 4. Further, in some embodiments, the steps of the process may be performed in different orders than the order described in conjunction with FIG. 4. The process described in conjunction with FIG. 4 may be carried out by components of the security service server 130 in various embodiments.

As shown in FIG. 4, the security service server 130 receives 402 an input to be encrypted, e.g., from a client device 110. In some embodiments, the input may include cleartext data. The pre-encryption module 212 of the security service server 130 applies 404 a pre-encryption to the input by performing one or more rounds of data transformations. The pre-encryption transforms the cleartext data into non-cleartext data. The core encryption module 214 of the security service server 130 applies 406 a core encryption to the non-cleartext data. The core encryption may include an Advanced Encryption Standard (AES) cipher algorithm that transforms the non-cleartext data into encrypted ciphertext. The post-encryption module 216 of the security service server 130 applies 408 a post-encryption to the encrypted ciphertext. The post-encryption includes one or more rounds of additional data transformations.

In some embodiments, each of the one or more rounds of data transformations in the pre-encryption and the one or more rounds of additional data transformations in the post-encryption includes a unique substitution box relative to one another and relative to a substitution box used by the AES cipher algorithm. When applying the pre-encryption to the input, the pre-encryption module 212 of the security service server 130 may apply encryptions using the substitution boxes. In some implementations, to apply the pre-encryption, the pre-encryption module 212 of the security service server 130 may apply a first round of the one or more rounds of data transformations to the input to mix a first set of bytes in the input and apply a second round of the one or more rounds of data transformations to the input to mix a second set of bytes in the input. The first set of bytes and the second set of bytes form a complete set of bytes included in the input. In some embodiments, each round of the data transformations in the pre-encryption and the additional data transformations in the post-encryption comprises a unique round key for transforming data in the respective data transformation. In some implementations, to apply the post-encryption, the post-encryption module 216 of the security service server 130 may applies a non-linear substitution of bytes to the encrypted ciphertext in each round of the additional data transformations.

The encryption module 202 of the security service server 130 stores 410 an output 320 from the post-encryption as an encryption of the input. In some embodiments, the encryption module 202 of the security service server 130 may store the output at a local client device, e.g., a data store in a client device.

Figure 5:
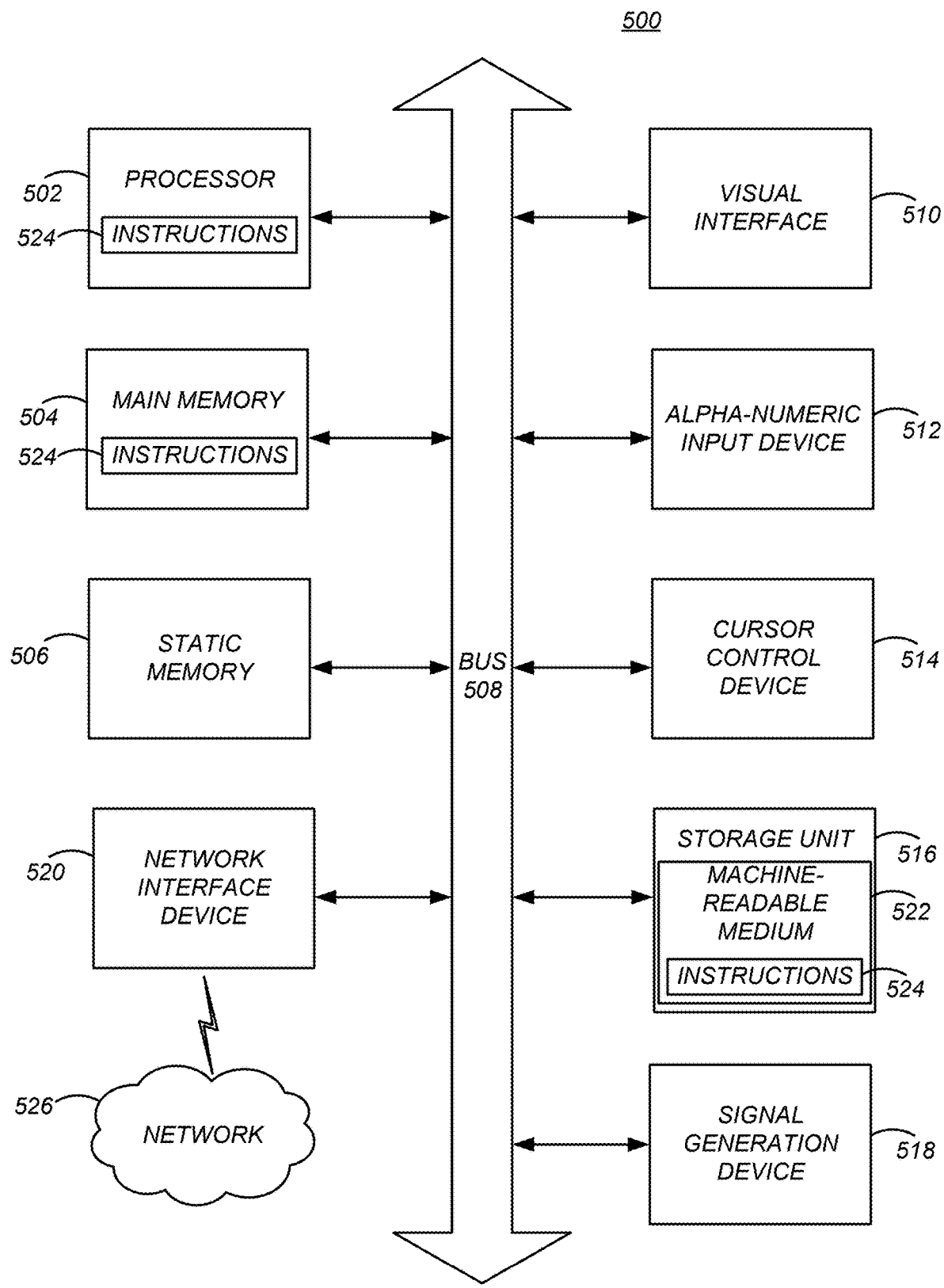
FIG. 5 is a block diagram illustrating components of an example machine able to read instructions from a machine-readable medium and execute them in a processor (or controller), according to one or more embodiments.

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    receiving an input comprising cleartext data;
    receiving, via an application program interface (API), a password from a user;
    receiving, via the API, from a security service server, a derived key generated using the password;
    generating an encryption key using the derived key for at least one of a pre-encryption, a core encryption and a post-encryption;
    applying the pre-encryption to the input by performing one or more rounds of data transformations, the pre-encryption transforming the cleartext data into non-cleartext data;
    applying the core encryption to the non-cleartext data, the core encryption comprising a standard encryption algorithm that transforms the non-cleartext data into encrypted ciphertext;
    applying the post-encryption to the encrypted ciphertext, the post-encryption comprising one or more rounds of additional data transformations; and
    generating, at a local client device, an encryption of the input based on an output from the post-encryption.

2. The method of claim 1, wherein each of the one or more rounds of data transformations in the pre-encryption and the one or more rounds of additional data transformations in the post-encryption includes a unique substitution box relative to one another and relative to a substitution box used by an Advanced Encryption Standard (AES) cipher algorithm.

3. The method of claim 1, wherein the pre-encryption, core encryption and post-encryption are under a Whitebox encryption.

4. The method of claim 1, wherein applying the post-encryption comprises:
applying a non-linear substitution of bytes to the encrypted ciphertext in each round of the additional data transformations.

5. The method of claim 1, wherein each round of the data transformations in the pre-encryption and the additional data transformations in the post-encryption comprises a unique round key for transforming data in the respective data transformation.

6. The method of claim 1, wherein applying the pre-encryption to the input comprises:
applying a first round of the one or more rounds of data transformations to the input to mix a first set of bytes in the input; and
applying a second round of the one or more rounds of data transformations to the input to mix a second set of bytes in the input, wherein the first set of bytes and the second set of bytes form a complete set of bytes included in the input.

7. A non-transitory computer readable medium configured to store instructions, the instructions when executed by one or more processors causing the one or more processors to perform operations, the instructions comprising instructions to:
receive an input comprising cleartext data;
receive, via an application program interface (API), a password from a user;
receive, via the API, from a security service server, a derived key generated using the password;
generate an encryption key using the derived key for at least one of a pre-encryption, a core encryption and a post-encryption;
apply the pre-encryption to the input by performing one or more rounds of data transformations, the pre-encryption transforming the cleartext data into non-cleartext data;
apply the core encryption to the non-cleartext data, the core encryption comprising a standard encryption algorithm that transforms the non-cleartext data into encrypted ciphertext;
apply the post-encryption to the encrypted ciphertext, the post-encryption comprising one or more rounds of additional data transformations; and
generate, at a local client device, an encryption of the input based on an output from the post-encryption.

8. The non-transitory computer readable medium of claim 7, wherein each of the one or more rounds of data transformations in the pre-encryption and the one or more rounds of additional data transformations in the post-encryption includes a unique substitution box relative to one another and relative to a substitution box used by an Advanced Encryption Standard (AES) cipher algorithm.

9. The non-transitory computer readable medium of claim 7, wherein the pre-encryption, core encryption and post-encryption are under a Whitebox encryption.

10. The non-transitory computer readable medium of claim 7, wherein the instructions to apply the post-encryption comprise instructions to:
apply a non-linear substitution of bytes to the encrypted ciphertext in each round of the additional data transformations.

11. The non-transitory computer readable medium of claim 7, wherein each round of the data transformations in the pre-encryption and the additional data transformations in the post-encryption comprises a unique round key for transforming data in the respective data transformation.

12. The non-transitory computer readable medium of claim 7, wherein the instructions to apply the pre-encryption to the input comprise instructions to:
apply a first round of the one or more rounds of data transformations to the input to mix a first set of bytes in the input; and
apply a second round of the one or more rounds of data transformations to the input to mix a second set of bytes in the input, wherein the first set of bytes and the second set of bytes form a complete set of bytes included in the input.

13. A system comprising memory with instructions encoded thereon that, when executed by one or more processors, cause the one or more processors to perform operations comprising:
receiving an input comprising cleartext data;
receiving, via an application program interface (API), a password from a user;
receiving, via the API, from a security service server, a derived key generated using the password;
generating an encryption key using the derived key for at least one of a pre-encryption, a core encryption and a post-encryption;
applying the pre-encryption to the input by performing one or more rounds of data transformations, the pre-encryption transforming the cleartext data into non-cleartext data;
applying the core encryption to the non-cleartext data, the core encryption comprising a standard encryption algorithm that transforms the non-cleartext data into encrypted ciphertext;
applying the post-encryption to the encrypted ciphertext, the post-encryption comprising one or more rounds of additional data transformations; and
generating, at a local client device, an encryption of the input based on an output from the post-encryption.

14. The system of claim 13, wherein each of the one or more rounds of data transformations in the pre-encryption and the one or more rounds of additional data transformations in the post-encryption includes a unique substitution box relative to one another and relative to a substitution box used by an Advanced Encryption Standard (AES) cipher algorithm.

15. The system of claim 13, wherein the operations further comprise:
receiving a password from a user;
generating a derived key using the password; and
generating an encryption key using the derived key for at least one of the pre-encryption, the core encryption and the post-encryption.

16. The system of claim 13, wherein applying the post-encryption comprises:
applying a non-linear substitution of bytes to the encrypted ciphertext in each round of the additional data transformations.

17. The system of claim 13, wherein the pre-encryption, core encryption and post-encryption are under a Whitebox encryption.

18. The system of claim 13, wherein applying the pre-encryption to the input comprises:
applying a first round of the one or more rounds of data transformations to the input to mix a first set of bytes in the input; and applying a second round of the one or more rounds of data transformations to the input to mix a second set of bytes in the input, wherein the first set of bytes and the second set of bytes form a complete set of bytes included in the input.

* * * * *